United States Patent [19]

Hicks

[11] Patent Number: 4,612,050

[45] Date of Patent: Sep. 16, 1986

[54] SODIUM SILICATE COMPOSITION

[76] Inventor: Hamilton Hicks, 60 Butternut Hollow Rd., Greenwich, Conn. 06830

[21] Appl. No.: 660,236

[22] Filed: Oct. 12, 1984

Related U.S. Application Data

[63] Continuation-in-part of Ser. No. 552,869, Nov. 18, 1983, abandoned, which is a continuation of Ser. No. 392,766, Jun. 28, 1982, abandoned.

[51] Int. Cl.⁴ .................................................. C09D 5/16
[52] U.S. Cl. ...................................... 106/18.12; 106/74
[58] Field of Search ............................... 106/74, 18.12

[56] References Cited

U.S. PATENT DOCUMENTS

| | | | |
|---|---|---|---|
| 1,581,732 | 4/1926 | Hageman | 106/74 |
| 2,407,615 | 9/1946 | Moon | 106/84 |
| 3,028,340 | 4/1962 | Gandon et al. | 106/74 |

*Primary Examiner*—Lorenzo B. Hayes
*Attorney, Agent, or Firm*—Kenyon & Kenyon

[57] ABSTRACT

A mineralized sodium silicate solution for the application to wood has a composition causing it to penetrate the wood and jell within the wood so as to give the wood the non-burning characteristics of petrified wood.

3 Claims, No Drawings

SODIUM SILICATE COMPOSITION

This is a continuation-in-part of application Ser. No. 552,869, filed Nov. 18, 1983 abandoned which was a continuation of Ser. No. 392,766 filed June 28, 1982 abandoned.

Sodium silicate, when freshly applied to wood, provides protection against fire for a limited time, particularly if repeated applications are used. For this, the commercial viscous solution is diluted with water to give a liquid of suitable viscosity for coating the wood by brushing or spraying.

Unfortunately, sodium silicate coatings are not stable in the presence of moisture. When exposed to high humidity conditions, a coating formed by a high ratio of sodium silicate to water cracks and peels; and when formed by a lower ratio solution, it becomes soft and even sometimes drips.

The prior art has proposed the addition of silicic acid to a dilute water solution of sodium silicate, to which is then added the commercial viscous syrup to provide an alkaline solution, hopefully to provide a less soluble coating when dry.

Under certain conditions, wood exposed to the natural elements for a great number of years under favorable conditions becomes petrified. It is then incombustible. This phenomenon has not had any practical application.

Briefly summarized, the present invention is a sodium silicate solution adapted for application to wood and comprises mineral water and sodium silicate acidified to an incipient jelling condition. When applied to wood, the solution penetrates the wood. The mineral water and sodium silicate are relatively proportioned so the solution is a liquid of suitable viscosity and is acidified to the incipient jelling condition to a degree causing jelling after penetrating the wood, but not prior thereto. That is to say, the solution can be stored and shipped, but after application to the wood, jells in the wood. When its mineral content is high enough, the penetrated wood acquires the characteristics of petrified wood.

The wood can no longer be made to burn even when exposed to moisture, or high humidity, for a prolonged period of time. The apparent petrification is obtained quickly by drying the wood.

It is possible to use natural or volcanic mineral water into which the commercial sodium silicate solution (water glass) is dissolved, or to artificially mineralize water, by mixing it with mineral clay or gypsum, for example. For the acidification, citric or malic acid can be used, among other acids. Consequently, the solution can be completely non-toxic and can be used for application to horse stalls where it functions not only to prevent fire, but has the great practical advantage that although non-toxic it has an unpleasant taste that prevents destruction of the wood parts of the stall by horse chewing or nibbling the wood to shreds.

The stabling of expensive race horses has always involved the great peril of fire, and the expense of wood replacement due to horse chewing and nibbling.

A detailed description of the invention follows.

The sodium silicate may be the commercial viscous syrup commonly called water glass. The mineral water in which it is dissolved may be natural spring or volcanic water inherently having a high content of calcium, magnesium, manganese and other dissolved metal salts. For acidification to the incipient jelling condition, many acids are available, but diluted citric and malic acids are preferred. It is possible to use fruit juices.

The degree of acidification can be determined experimentally, too high a degree resulting in premature jelling and too low a degree preventing the jelling after the solution has penetrated the wood. In some cases it may be necessary to take into account the degree of acidity of the wood to which the solution is applied, a wood of low acid content requiring lower acidification of the solution, and a wood of higher acid content requiring less.

The mineral content of the mineral water used should be high enough or made high enough if necessary so that when the solution is applied to wood, the penetrated wood simulates petrification, although to carry this to a high degree may require two applications of the solution or immersion of the wood in the solution, particularly when the apparent petrification is to extend deep into the wood.

This new solution inherently penetrates wood to which the solution is applied. This applies particularly to soft woods, such as are commonly used for buildings and horse stalls. However, the solution can include any non-toxic surfactant, such as soap, and when used for horse stalls, it may include a very small amount of ammonium benzoate because this increases the inherently bad taste of the treated wood. For water softening and coloring purposes, the solution may also include a small amount of the blue-green algae currently obtained from Mexico and sold under the tradename Spirulina, the amount used depending largely on the degree of coloring desired.

When applied to wood or wood cellulose products, the observable action is hardening, density increase and apparent petrification similar to that occurring in naturally petrified wood. In the case of either wood or paper, the treated material can char but not burn. Experimentally, two racetrack horse stalls were filled with combustible material which was then set afire. Afterwards, the wood was charred but did not show signs of burning, and as a practical matter, the racetrack stable involved did not burn up, a matter of great practical importance around racetrack horse stables.

It is theorized that the minerals of this new solution penetrate the cells of the wood, replace the cells, and with jelling of the solution, harden the wood, an effect causing the petrification of the treated wood. It is believed that this is one reason why this new sodium silicate solution cannot be washed out of the treated wood with water, it appearing that there is a mineral transformation of the wood cellulose. This new solution apparently changes the wood structure to an apparent mineral structure, in many cases driving out of the wood its natural fluids which support combustion.

One example of this new solution, by volume, is as follows for 100 gallons of new solution:

5 percent saturated mineral water as obtained from combining water with mineral clays 50 percent sodium silicate solution containing at least 15 percent sodium silicate in dry form (by weight)

45 percent highly mineralized water, such as spring or volcanic water 1 ounce of a dilute acid having a pH of from 5.5 to 4

To obtain the saturated mineral water, mineral clay, preferably Freeport clay, is mixed with a small amount of water, for example, about 5 pounds of the clay to 5 gallons of water. This is stirred thoroughly, and after the minerals are transferred to the water from the clay, the water is decanted to obtain the highly mineralized water which is poured into the spring or volcanic water. For every 100 gallons of water, 5 gallons should be the highly mineralized water. This is then combined with the sodium silicate solution and acidified with a weak solution of acidic or citric acid, preferably having a pH of from 5.5 to 4. As previously indicated, the degree of acidification should be such that the solution remains liquid but in an incipient jelling condition permitting its application to wood or paper by brushing or spraying or submersion in the solution, but with the acidification sufficient to assure jelling after penetrating the wood or paper. Also, the degree of mineralization of the solution should be adequate to provide wood with its apparent petrified characteristics when desired.

If natural mineral water can be found which contains an adequate concentration of minerals, it may be unnecessary to resort to the artificial mineralization. If natural mineral water or volcanic water is unavailable, adequate minerals can be provided by more extended use of the artificial mineralization. Gypsum and possibly other mineral substances may be used to get adequate minerals into the water. If found more desirable than mixing and decanting, the clay or gypsum may be confined in a porous bag which is then immersed in water. In any event, the insoluble particles should be kept from getting into or remaining in the mineral water in which the sodium silicate is dissolved.

The unique jelling of the solution, when penetrated in the wood, can be attributed to the fact that due to its acidification, the solution is almost ready to jell, and that when in the wood jelling occurs due to further acidification by the acid or acids inherently present in wood, although evaporation may play its part. Wood thoroughly impregnated by this new solution as by repeated applications or submersion in the wood, after drying has all of the characteristics of petrified wood, and even its appearance. Wood treated by only one or two applications of this, new solution will not support combustion, and when applied to wood horse stalls, prevents destruction of the wood by horse chewing or nibbling.

In the foregoing, familiarity with the prior art use of sodium silicate solutions as a fire-retardant chemical is assumed. As described by the Merck Index, 9th Edition, there are sodium silicate solutions of varying compositions with respect to the ratio between the sodium and silica as well as various densities, but the most commonly used sodium silicate solution for fire proofing purposes contains about 40% $Na_2Si_3O_7$. Further, that for use the commercial viscous syrup is diluted with water to obtain a brushing consistency.

In its 1948 report Number R1280, entitled Fire-Retarding Coatings, the Forest Products Laboratory, U.S. Department of Agriculture, stated that as a fire-retarding chemical sodium silicate is available in a number of grades based on the soda-silica ratio, and that the grades with a high silica ratio are preferred.

In the case of the present invention the water has a high content of minerals, as previously described.

Although the mineral-containing water can be certain of the spring waters the springs are located at widely separated places throughout the world. Consequently, the use of natural mineral water in the commercial production of this new solution involves the disadvantage of shipping expense and possibly at times even unavailability.

For commercial use the previously described artificial mineralization should preferably be practiced. In addition to Freeport clay and gypsum previously suggested, any of the following clays can be used because of their known mineral content:
Microlite
China Clay as found in Georgia
Pascalite Montana
Volcanic Ash
Desert Mineral Clay
Bentonite Such clays when distributed in water with time produce a substantially clear or uncolored mineralized decanted water. The starting water can be ordinary tap water in most cases but should not be acid to a degree that might cause premature jelling or coagulation when subsequently blended with the sodium silicate solution. Material acidity might interfere with the subsequent determination of the degree of acidification required to provide the incipient jelling condition. Any potable water is suitable providing it is not too acidic or heavily chlorinated.

In the following example microlite clay is used, reportedly containing minerals as follows:

| | |
|---|---|
| Ferric Oxide $Fe_2O_3$ | 7.51% |
| Aluminum Oxide $Al_2O_3$ | 5.85% |
| Phosphoric Acid $P_2O_5$ | 0.88% |
| Magnesium Oxide MgO | 20.06% |
| Silica $SiO_2$ | 44.14% |
| Sodium Oxide $Na_2O$ | 0.89% |
| Potassium Oxide $K_2O$ | 2.89% |
| Titanium Oxide $TiO_2$ | 0.87% |
| Sulphites $SO_3$ | 0.001% |
| Calcium Oxide CaO | 9.12% |
| Molybdenum $MO_2$ | 0.0052% |
| Manganese Oxide MnO | 0.142% |
| Chromic Oxide $Cr_2O_3$ | 0.064% |
| Vanadium Oxide $V_2O_3$ | 0.071% |
| Nickel Oxide NiO | 0.172% |
| Barium Oxide BaO | 0.001% |
| Strotium Oxide SrO | 0.22% |
| Lithium Oxide $Li_2O$ | 0.14% |
| Copper Oxide $Cu_2O$ | 0.005% |
| Zinc Oxide ZNO | 0.012% |

For small scale commercial production 20 lbs. of the clay can be thoroughly stirred or blended by agitation into 20 gallons of the water, the mixture then being allowed to stand to allow the clay to settle and leave most of its water soluble minerals in the water which is then substantially clear from clay particles. Such settling occurs in approximately six hours. The water should contain the maximum possible amount of the minerals from the clay. The concentration of minerals can be increased by the use of warm water having a temperature in the area of 100° F.

The resulting substantially clear heavily mineralized water can then be mixed with the sodium silicate solution which dissolves in the water preferably so that the resulting solution contains approximately 15% by weight of the sodium silicate. For example, if the commonly used sodium silicate solution has been purchased, about 20 gallons of it is mixed with the 20 gallons of mineralized water. At this time no chemical reaction is involved and precise proportioning of the mineralized water and sodium silicate solution is not manditory. Sodium silicate absorbed from the microlite represents an addition of sodium silicate content.

To insure permanent fixation of the minerals below the material's surface the acidification of the solution to an incipient jelling condition is required prior to the application. The 20 gallons of the sodium silicate solution and 20 gallons of mineralized water provide 40 gallons and a small sample of this can be acidified slowly to provide an increasing degree of acidification up to the point where jelling or coagulation becomes apparent. This shows that just slightly less acidification of the 40 gallons, for the particular acid used. As previously suggested, citric or malic acid can be used but in any event a non-toxic acid is preferred. For commercial use the jelling condition should not be approached so closely as to make shipping and storage of the solution impractical.

What is claimed is:

1. A liquid sodium silicate composition for application to wood for artifically petrifying the wood consisting of a liquid solution of sodium silicate dissolved in mineralized water and produced by mixing five pounds of a mineral-containing clay with five gallons of water, allowing the mixture to stand until the water leaches a substantial amount of minerals from the clay and thereafter separating the artificially mineralized water from the clay, mixing said separated water with about one-hundred gallons of naturally mineralized spring water combining said mixture of water with a solution of sodium silicate and acidifying with an acid solution having a pH of from 5.5 to 4 to an incipient gelling condition; wherein the composition, upon application to wood, penetrates, gels and fixes the minerals from the composition in the wood.

2. The composition of claim 1 containing at least 15% by weight of sodium silicate.

3. A method for making a sodium silicate solution adapted for application to porous wood and wood cellulose products and comprising mixing a mineral-containing clay in water, allowing transfer of minerals to the water, separating the clay from the water and dissolving the sodium silicate solution in said mineralized water, and acidifying the solution to an incipient gelling condition so as to cause it to gel within the product after application.

* * * * *